United States Patent [19]

Bartol et al.

[11] Patent Number: 6,143,367
[45] Date of Patent: Nov. 7, 2000

[54] COATING AGENT AND METHOD FOR PRODUCING SAME

[75] Inventors: Fritz Bartol, Hamm; Hubert Baumgart, Münster; Ulrike Röckrath, Senden, all of Germany

[73] Assignee: BASF Coatings AG, Muenster-Hiltrup, Germany

[21] Appl. No.: 09/331,104

[22] PCT Filed: Dec. 18, 1997

[86] PCT No.: PCT/EP97/07110

§ 371 Date: Jul. 27, 1999

§ 102(e) Date: Jul. 27, 1999

[87] PCT Pub. No.: WO98/27134

PCT Pub. Date: Jun. 25, 1998

[30] Foreign Application Priority Data

Dec. 18, 1996 [DE] Germany ............... 196 52 886
Jun. 14, 1997 [DE] Germany ............... 197 25 188

[51] Int. Cl.$^7$ ...................................... B05D 3/02
[52] U.S. Cl. ................ 427/388.2; 427/391; 427/393; 427/393.5; 427/408; 427/409; 427/412.1; 528/73
[58] Field of Search ............... 528/73; 427/385.5, 427/388.2, 391, 393, 408, 409, 412.1, 393.5

[56] References Cited

U.S. PATENT DOCUMENTS

| | | |
|---|---|---|
| 4,397,989 | 8/1983 | Adesko . |
| 4,720,405 | 1/1988 | Carson et al. . |
| 4,939,213 | 7/1990 | Jacobs, III et al. . |
| 5,084,541 | 1/1992 | Jacobs, III et al. . |
| 5,380,816 | 1/1995 | Sullivan . |
| 5,475,073 | 12/1995 | Guo . |
| 5,480,943 | 1/1996 | Guo . |
| 5,516,559 | 5/1996 | Röckrath et al. . |
| 5,534,598 | 7/1996 | Guo . |
| 5,593,735 | 1/1997 | Wu et al. . |
| 5,626,917 | 5/1997 | Brock et al. . |
| 5,716,678 | 2/1998 | Röckrath et al. . |
| 5,741,880 | 4/1998 | Valpey, III et al. . |
| 5,852,133 | 12/1998 | Gupta et al. . |
| 5,981,080 | 11/1999 | Rockrath et al. . |

FOREIGN PATENT DOCUMENTS

| | | |
|---|---|---|
| 0 038 127 B1 | 10/1984 | European Pat. Off. . |
| 0 228 993 A1 | 12/1986 | European Pat. Off. . |
| 0 245 700 B1 | 4/1987 | European Pat. Off. . |
| 0 260 447 A2 | 8/1987 | European Pat. Off. . |
| 0 320 552 A1 | 12/1987 | European Pat. Off. . |
| 0 297 576 A1 | 6/1988 | European Pat. Off. . |
| 0 195 931 B1 | 10/1988 | European Pat. Off. . |
| 0 541 966 A2 | 10/1992 | European Pat. Off. . |
| 0 541 966 A3 | 10/1992 | European Pat. Off. . |
| 0 565 774 A3 | 11/1992 | European Pat. Off. . |
| 0 604 922 A1 | 12/1993 | European Pat. Off. . |
| 0 624 577 A1 | 5/1994 | European Pat. Off. . |
| WO 95/23653 | 9/1995 | European Pat. Off. . |
| 0 089 497 B2 | 3/1996 | European Pat. Off. . |
| 0 767 185 A1 | 4/1997 | European Pat. Off. . |
| 28 18 100 C2 | 4/1978 | Germany . |
| 26 39 491 | 9/1978 | Germany . |
| 33 33 072 A1 | 9/1983 | Germany . |
| 36 28 124 A1 | 8/1986 | Germany . |
| 38 14 853 A1 | 5/1988 | Germany . |
| 39 03 804 A1 | 2/1989 | Germany . |
| 195 10 651 A1 | 6/1994 | Germany . |
| 195 29 124 C1 | 8/1995 | Germany . |
| 2 012 191 | 12/1978 | United Kingdom . |

OTHER PUBLICATIONS

Resines Alkydes–Polyesters by J. Bourry, Paris, Dunod 1952, Alkyd Resins by C.R. Martens, Reinhold Publishing Corporation, New York 1961.

Alkyd Resin Technology by T.C. Patton, Interscience Publishers 1962.

Primary Examiner—Erma Cameron

[57] ABSTRACT

The invention relates to a component system for a two-component coating composition comprising a hydroxy-functional binder or a mixture of hydroxy-functional binders, tris(alkoxycarbonylamino)triazine or a mixture of tris(alkoxycarbonylamino)triazines and free isocyanates or a mixture of free polyisocyanates. It is characterized in that a first component (I) is formed at least from the hydroxy-functional binder or the mixture of hydroxy-functional binders and in that a second component (II) is formed at least from the free isocyanates or the mixture of free polyisocyanates, where the tris(alkoxycarbonylamino) triazine or the mixture of tris(alkoxycarbonylamino) triazines is alternatively a constituent of the first component (I), the second component (II) or both components (I) and (II).

19 Claims, No Drawings

COATING AGENT AND METHOD FOR PRODUCING SAME

This is the national stage of international application no. PCT/E97/07110, filed Dec. 18, 1997.

The present invention relates to a two-component system for a multicomponent coating composition comprising (1) a hydroxy-functional binder or a mixture of hydroxy-functional binders, (2) tris(alkoxycarbonylamino)triazine or a mixture of tris(alkoxycarbonylamino)triazines and (3) free isocyanates or a mixture of free isocyanates. The invention also relates to a process for preparing such a component system and to its use.

By component system is meant a package of different coatings components which are prepared and stored separately and yet are always dealt with in conjunction with one another and which are mixed to form a coating composition by a user wishing to produce a coating from the coating composition, before the coating is produced. Component systems of this kind are common, inter alia, in the preparation of topcoats. The term topcoats here refers to coating materials which are used to produce the topmost coat. This topmost coat can itself comprise one or more coats, especially two coats. Two-coat topcoat finishes consist of a pigmented basecoat film and, applied thereto, a clearcoat film which is pigmented only with transparent pigments if at all. Two-coat finishes are nowadays produced by the wet-on-wet method, in which a pigmented basecoat is applied first and the resulting basecoat film is coated over with a clearcoat, without a baking step, and then basecoat film and clearcoat film are cured together. This method is very advantageous economically but places high demands on the basecoat and the clearcoat. The clearcoat applied to the as yet uncured basecoat must not cause bleeding of the basecoat film or any other disruption, since otherwise finishes of poor appearance are obtained. This applies in particular to finishes for which basecoats comprising special-effect pigments (e.g. metal pigments, especially aluminium flakes, or pearlescent pigments) are employed.

Component systems for clearcoats, which are used predominantly for the finishing of cars, consist usually of hydroxy-functional polyacrylates with free isocyanate trimers of hexamethylene diisocyanate. The resulting clearcoats in the application-ready state have a solids content of from 32 to 45% by weight. Their advantages lie in a low curing temperature of from 20 to 120 degrees C. and high chemical resistance. These clearcoat systems, however, currently have a number of serious disadvantages compared with melamine resin-crosslinked one-component clearcoats:

1. Inadequate scratch resistance, especially to light superficial damage.
2. Poor stone-chip resistance (adhesion) after exposure to condensation, especially following a refinish.
3. A solids content so low as to be disruptive on environmental and economic grounds.
4. Severe redissolution on conventional basecoats, which is manifested in reduced flop in the case of metallic basecoats or in changes in shade in the base-coat, especially if an attempt is made to raise the solids content by including acrylate resins of low molecular weight.

One-component clearcoats do not exhibit these problems, or at least not to the same extent, but because of their much poorer chemical resistance cannot be used in place of two-component clearcoats.

The object of the present invention, therefore, is to provide a coating composition which does not feature the abovementioned disadvantages of customary two-component clearcoat systems but which has a resistance to chemicals and to weathering which is comparable with that of customary two-component clearcoat systems.

This object is achieved in accordance with the invention by a component system which is characterized in that a first component (I) is formed at least from the hydroxy-functional binder or from the mixture of hydroxy-functional binders (1) and in that a second component (II) is formed at least from the free isocyanates or from the mixture of free isocyanates (3), the tris(alkoxycarbonylamino)triazine or the mixture of tris(alkoxycarbonylamino)triazines (2) is alternatively a constituent of the first component (I), the second comonent (II) or both components (I) and (II).

Surprisingly, through the use of a crosslinker combination comprising tris(alkoxycarbonylamino)triazine and free isocyanates, the invention achieves considerable advantages over customary two-component clearcoats. These advantages include in particular:

reduced bleeding of conventional basecoats, evident in particular in an improved metal effect in the case of metallic basecoats;

improved adhesion in stone-chip tests;

improved scratch resistance coupled with high acid resistance.

Reference DE 195 29 124 C1 discloses in principle a coating composition which also uses tris-(alkoxycarbonylamino)triazine as crosslinker. The coating compositions described in this reference, however, are without exception one-component coating compositions. While a general reference is made to the existence of multicomponent systems, no information whatsoever, or even mere indications, are given as to what might be the composition of various components.

For the hydroxy-functional binder or for the mixture of hydroxy-functional binders it is preferred to consider those from the group "binders based on hydroxy-functional polyacrylates, hydroxy-functional polyesters and/or hydroxy-functional polyurethanes" and/or mixtures of members of this group and/or mixtures of different binders of a member of this group.

In accordance with the invention it is preferred to employ polyacrylate resins which have hydroxyl numbers of from 40 to 240, preferably from 60 to 210 and, with very particular preference, from 100 to 200, acid numbers of from 0 to 35, preferably from 0 to 23 and, with very particular preference, from 3.9 to 15.5, glass transition temperatures of from −35 to +70° C., preferably from −20 to +40° C. and, with very particular preference, from −10 to +15° C., and number-average molecular weights of from 1500 to 30,000, preferably from 2000 to 15,000 and, with very particular preference, from 2500 to 5000.

The glass transition temperature of the polyacrylate resins is determined by the nature and amount of the monomers employed. The selection of the monomers can be made by the skilled worker with the aid of the following formula, by which the glass transition temperatures of polyacrylate resins can be calculated approximately:

$$\frac{1}{T_g} = \sum_{1}^{i} \frac{W_i}{T_{g,i}}$$

$T_g$=glass transition temperature of the polyacrylate resin.

$W_i$=the weight-share of the i-th monomer in the polyacrylate resin.

$T_{g,i}$=the glass transition temperature of the homopolymer of the i-th monomer.

Measures to control the molecular weight (e.g. selection of appropriate polymerization initiators, use of chain transfer agents, etc.) are part of the expert knowledge of the skilled worker and need not be explained here.

As the hydroxy-functional binder component use is also made, for example, of polyester resins or alkyd resins which can be prepared by reacting (a1) a cycloaliphatic or aliphatic polycarboxylic acid or a mixture of such polycarboxylic acids, (b1) an aliphatic or cycloaliphatic polyol having more than two hydroxyl groups in the molecule or a mixture of such polyols, (c1) an aliphatic or cycloaliphatic diol or a mixture of such diols and (d1) an aliphatic linear or branched saturated monocarboxylic acid or a mixture of such monocarboxylic acids, in a molar ratio of (a1):(b1) (c1):(d1)= 1.0:0.2–1.3:0.0–1.1:0.0–1.4, preferably 1.0:0.5–1.2:0.0–0.6:0.2–0.9, to form a polyester resin or alkyd resin. Examples of the constituent (a1) are hexahydrophthalic acid, 1,4-cyclohexanedicarboxylic acid, endomethylenetetrahydrophthalic acid, oxalic acid, malonic acid, succinic acid, glutaric acid, adipic acid, pimelic acid, suberic acid, azelaic acid and sebacic acid. Examples of the constituent (b1) are: pentaerythritol, trimethylolpropane, trimethylolethane and glycerol. Examples of the constituent (c1) are: ethylene glycol, diethylene glycol, propylene glycol, neopentyl glycol, 2-methyl-2-propyl-1,3-propanediol, 2-ethyl-2-butyl-1,3-propanediol, 2,2,4-trimethyl-1,5-pentanediol, 2,2,5-trimethyl-1,6-hexanediol, neopentyl glycol hydroxypivalate and dimethylolcyclohexane. Examples of the constituent (d1) are: 2-ethylhexanoic acid, lauric acid, isooctanoic acid, isononanoic acid and monocarboxylic acid mixtures obtained from coconut oil or palm kernel oil.

The preparation of hydroxyl-bearing polyester and/or alkyd resins is described, for example, in Ullmanns Encyklopädie der technischen Chemie, third edition, volume 14, Urban & Schwarzenberg, Munich, Berlin 1963, pages 80 to 89 and pages 99 to 105, and in the following books: Résines Alkydes-Polyesters by J. Bourry, Paris, Dunod 1952, Alkyd Resins by C. R. Martens, Reinhold Publishing Corporation, New York 1961 and Alkyd Resin Technology by T. C. Patton, Interscience Publishers 1962.

As the hydroxy-functional binder component use is also made, for example, of polyacrylate resins which can be prepared by subjecting (a2) from 10 to 92, preferably from 20 to 60% by weight of an alkyl or cycloalkyl acrylate or of an alkyl or cycloalkyl methacrylate having 1 to 18, preferably 4 to 13 carbon atoms in the alkyl or cycloalkyl radical, or mixtures of such monomers, (b2) from 8 to 60, preferably from 12.5 to 38.5% by weight of a hydroxyalkyl acrylate or of a hydroxyalkyl methacrylate having 2 to 4 carbon atoms in the hydroxyalkyl radical, or mixtures of such monomers, (c2) from 0.0 to 5.0, preferably from 0.7 to 3.0% by weight of acrylic acid or methacrylic acid, or mixtures of these monomers, and (d2) from 0 to 50, preferably from 0 to 30% by weight of ethylenically unsaturated monomers which are different from (a2), (b2) and (c2) and can be copolymerized with (a2), (b2) and (c2), or mixtures of such ethylenically unsaturated monomers, to polymerization to form polyacrylate resins having hydroxyl numbers of from 40 to 240, preferably from 60 to 150, acid numbers of from 0 to 35, preferably from 5 to 20, glass transition temperatures of from −35 to +70 degrees C., preferably from −20 to +40 degrees C., and number-average molecular weights of from 1500 to 30,000, preferably from 2000 to 15,000 (determined by gel permeation chromatography with a polystyrene standard). Examples of (a2) components are methyl, ethyl, propyl, n-butyl, isobutyl, tert-butyl, pentyl, hexyl, heptyl and 2-ethylhexyl acrylate and methacrylate, and also cyclohexyl acrylate and cyclohexyl methacrylate. Examples of (b2) components are hydroxyethyl, hydroxypropyl and hydroxybutyl acrylate and methacrylate. Examples of (d2) components are vinylaromatic compounds, for example styrene, vinyltoluene, alpha-methylstyrene, alpha-ethylstyrene, ring-substituted diethylstyrenes, isopropylstyrene, butylstyrenes and methoxystyrenes; vinyl ethers, for example ethyl vinyl ether, n-propyl vinyl ether, isopropyl vinyl ether, n-butyl vinyl ether and isobutyl vinyl ether, and vinyl esters, for example vinyl acetate, vinyl propionate, vinyl butyrate, vinyl pivalate and the vinyl ester of 2-methyl-2-ethylheptanoic acid. The hydroxyl number and the acid number of the polyacrylate resins can easily be controlled by the skilled worker through the amount of component (b2) and/or (c2) employed.

Further suitable polyacrylate components are the hydroxy-functional compounds specified in European Patent Application EP 0 767 185 and in U.S. Pat. Nos. 5,480,943, 5,475,073 and 5,534,598.

As the hydroxy-functional binder component use is also made, for example, of polyacrylate resins obtainable by subjecting (A1) from 10 to 51% by weight, preferably from 25 to 41% by weight, of 4-hydroxy-n-butyl acrylate or 4-hydroxy-n-butyl methacrylate or a mixture of 4-hydroxy-n-butyl acrylate and 4-hydroxy-n-butyl methacrylate, preferably 4-hydroxy-n-butyl acrylate, (A2) from 0 to 36% by weight, preferably from 0.1 to 20% by weight, of a hydroxyl-containing ester—other than (A1)—of acrylic acid or of methacrylic acid, or of a mixture of such monomers, (A3) from 28 to 85% by weight, preferably from 40 to 70% by weight, of an aliphatic or cycloaliphatic ester of methacrylic acid having at least 4 C atoms in the alcohol radical, which ester is different from (A1) and (A2), or of a mixture of such monomers, (A4) from 0 to 3% by weight, preferably from 0.1 to 2% by weight, of an ethylenically unsaturated carboxylic acid or of a mixture of ethylenically unsaturated carboxylic acids, and (A5) from 0 to 20% by weight, preferably from 5 to 15% by weight of an unsaturated monomer which is different from (A1), (A2), (A3) and (A4), or of a mixture of such monomers, to polymerization to give a polyacrylate resin having a hydroxyl number of from 60 to 200, preferably from 100 to 160, an acid number of from 0 to 35, preferably from 0 to 25, and a number-average molecular weight of from 1500 to 10,000, preferably from 2500 to 5000, the sum of the proportions by weight of the components (A1) to (A5) always being 100% and the composition of component (A3) being chosen such that polymerization of component (A3) alone produces a polymethacrylate resin having a glass transition temperature of from +10 to +100 degrees C., preferably from +20 to +60 degrees C. Examples of the component (A2) are hydroxyalkyl esters of acrylic acid, such as hydroxyethyl acrylate and hydroxypropyl acrylate, for example, and hydroxyalkyl esters of methacrylic acid, such as hydroxyethyl methacrylate and hydroxypropyl methacrylate, for example, the choice being made such that polymerization of component (A2) alone produces polyacrylate resin having a glass transition temperature of from 0 to +80 degrees C., preferably from +20 to +60 degrees C. Examples of the component (A3) are aliphatic esters of methacrylic acid having 4 to 20 C atoms in the alcohol residue, such as N-butyl, isobutyl, tert-butyl, 2-ethylhexyl, stearyl and lauryl methacrylate, for example, and cycloaliphatic esters of methacrylic acid, such as cyclohexyl methacrylate, for example. As component (A4) it is preferred to employ acrylic acid and/or methacrylic acid. Examples of the component (A5) are vinylaromatic hydrocarbons, for example styrene, α-alkylstyrenes and vinyltoluene, amides of acrylic acid and methacrylic acid, for example methacrylamide and acrylamide, nitrites of acrylic acid and methacrylic acid, vinyl ethers and vinyl esters. As component (A5) it is preferred to employ vinylaromatic hydrocarbons, especially styrene. The composition of component (A5) should preferably be ordered such that polymerization of component (A5) alone produces a polymer having a glass transition temperature of from +70 to +120 degrees C., preferably from +80 to +100 degrees C. The preparation of these polyacrylate resins can be carried out by generally and well-known polymerization techniques (see for example Houben-Weyl, Methoden der organischen Chemie, 4th edition, volume 14/1, page 24 to 255 (1961)). They are preferably prepared by means of solvent polymerization. In this case, it is common to introduce an organic solvent or solvent mixture as initial charge and to heat this initial charge to boiling. The monomer mixture to be polymerized, and one or more polymerization initiators, are then added continuously to this organic solvent or solvent mixture. Polymerization takes place at temperatures between 100 and 160 degrees C., preferably between 130 and 150 degrees C. The polymerization initiators employed are preferably initiators which form free radicals. The nature and amount of initiator are usually chosen so that at the polymerization temperature there is a largely constant supply of free radicals available during the feed addition phase. Examples of initiators which can be employed are dialkyl peroxides, for example di-tert-butyl peroxide and dicumyl peroxide, hydroperoxides, for example cumene hydroperoxide and tert-butyl hydroperoxide, peresters, for example tert-butyl perbenzoate, tert-butyl perpivalate, tert-butyl per-3,5,5-trimethylhexanoate and tert-butyl per-2-ethylhexanoate. The polymerization conditions (reaction temperature, feed time of the monomer mixture, nature and amount of the organic solvents and polymerization initiators, possible use of molecular weight regulators, e.g. mercaptans, thioglycolic esters and chlorinated hydrocarbons) are selected so that the polyacrylate resins have a number-average molecular weight as indicated (determined by gel permeation chromatography using polystyrene as calibration substance) . The acid number can be adjusted by the skilled worker by using appropriate amounts of component (A4). Similar comments apply to the adjustment of the hydroxyl number. It can be controlled by way of the amount of component (A1) and (A2) employed.

In accordance with the invention, polyurethane-based binders are also suitable.

It is essential to the invention, finally, that the coating composition includes the constituents (2) and (3), which are both crosslinking agents.

Employed as constituent (2) are tris(alkoxycarbonylamino)triazines of the formula

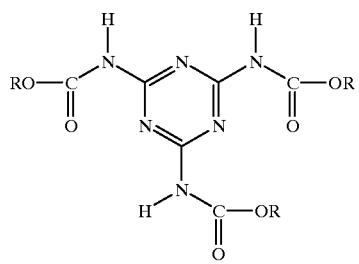

where R=methyl, butyl . . . groups. Derivatives of the abovementioned compounds can also be employed. For the constituent (2) it is preferred to employ tris(alkoxycarbonylamino)triazines as are described in U.S. Pat. No. 5,084,541.

The constituent (3) comprises as crosslinking agent at least one non-blocked di- and/or polyisocyanate which is dispersed or dissolved in one or more organic solvents which may or may not be dilutable with water. In addition, however, there may also be blocked isocyanate or a mixture of blocked polyisocyanates present.

The free polyisocyanate constituent which is necessarily employed comprises any desired organic polyisocyanates having free isocyanate groups attached to aliphatic, cycloaliphatic, araliphatic and/or aromatic structures. Preference is given to polyisocyanates having 2 to 5 isocyanate groups per molecule and having viscosities of from 100 to 2000 mPa.s (at 23 degrees C.). If desired, small amounts of organic solvent, preferably from 1 to 25% by weight based on pure polyisocyanate, can be added to the polyisocyanates in order thus to improve the ease of incorporation of the isocyanate and, if desired, to reduce the viscosity of the polyisocyanate to a value which is within the abovementioned ranges. Examples of solvents suitable as additives for the polyisocyanates are ethoxyethyl propionate, butyl acetate and the like. Examples of suitable isocyanates are described, for example, in Methoden der organischen Chemie, Houben-Weyl, volume 14/2, 4th edition, Georg Thieme Verlag, Stuttgart 1963, page 61 to 70, and by W. Siefken, Liebigs Ann. Chem. 562, 75 to 136. Suitable examples are the isocyanates mentioned in connection with the description of the polyurethane resins (A2), and/or isocyanate-functional polyurethane prepolymers which can be prepared by reacting polyols with an excess of polyisocyanates and which are preferably of low viscosity. It is also possible to employ polyisocyanates containing isocyanurate groups and/or biuret groups and/or allophanate groups and/or urethane groups and/or urea groups and/or uretdione groups. Polyisocyanates containing urethane groups, for example, are obtained by reacting some of the isocyanate groups with polyols, for example trimethylolpropane and glycerol. It is preferred to employ aliphatic or cycloaliphatic polyisocyanates, especially hexamethylene diisocyanate, dimerized and trimerized hexamethylene diisocyanate, isophorone diisocyanate, 2-isocyanatopropylcyclohexyl isocyanate, dicyclohexylmethane 2,4'-diisocyanate or dicyclohexylmethane 4,4'-diisocyanate or mixtures of these polyisocyanates. Very particular preference is given to the use of mixtures of polyisocyanates which are based on hexamethylene diisocyanate and which contain uretdione and/or isocyanurate groups and/or allophanate groups, such mixtures being as formed by catalytic oligomerization of hexamethylene diisocyanate using appropriate catalysts. The polyisocyanate constituent may additionally consist of any desired mixtures of the free polyisocyanates specified by way of example.

If blocked isocyanate is mixed in it is preferably in such a form that it comprises isocyanate groups blocked both with a blocking agent (Z1) and with a blocking agent (Z2), the blocking agent (Z1) being a dialkyl malonate or a mixture of dialkyl malonates, the blocking agent (Z2) being a blocking agent which is different from (Z1) and contains active methylene groups, or being an oxime or a mixture of these blocking agents, and the ratio of equivalents between the isocyanate groups blocked with (Z1) and the isocyanate groups blocked with (Z2) being between 1.0:1.0 and 9.0:1.0, preferably between 8.0:2.0 and 6.0:4.0 and, with particular preference, between 7.5:2.5 and 6.5:3.5. The blocked isocyanate is preferably prepared as follows. A polyisocyanate or a mixture of polyisocyanates is reacted in conventional manner with a mixture of the blocking agents (Z1) and (Z2) which comprises the blocking agents (Z1) and (Z2) in a molar ratio of between 1.0:1.0 and 9.0:1.0, preferably between 8.0:2.0 and 6.0:4.0 and, with particular preference, between 7.5:2.5 and 6.5:3.5. The polyisocyanate or the mixture of polyisocyanates can be reacted with the mixture of the blocking agents (Z1) and (Z2) to an extent such that isocyanate groups can no longer be detected. In practice, this may require the use of very large excesses of blocking agents and/or very long reaction times. It has been found that coating materials having good properties are obtained even when at least 50, preferably at least 70 percent of the isocyanate groups of the polyisocyanate or of the mixture of polyisocyanates are reacted with the mixture of the blocking agents (Z1) and (Z2) and the remaining isocyanate groups are reacted with a hydroxyl-containing compound or with a mixture of hydroxyl-containing compounds. Hydroxyl-containing compounds employed are preferably low molecular mass aliphatic or cycloaliphatic polyols such as neopentyl glycol, dimethylolcyclohexane, ethylene glycol, diethylene glycol, propylene glycol, 2-methyl-2-propyl-1,3-propanediol, 2-ethyl-2-butyl-1,3-propanediol, 2,2,4-trimethyl-1,5-pentanediol and 2,2,5-trimethyl-1,6-hexanediol or the hydroxyl-containing binder which can be employed as constituent (1). A suitable blocked polyisocyanate is also obtainable by mixing, with the blocking agent (Z1) and/or (Z2), blocked polyisocyanates in a ratio such that a mixture is obtained in which the ratio of equivalents between the isocyanate groups blocked with (Z1) and the isocyanate groups blocked with (Z2) is between 1.0:1.0 and 9.0:1.0, preferably between 8.0:2.0 and 6.0:4.0 and, with particular preference, between 7.5:2.5 and 6.5:3.5. In principle, all polyisocyanates which can be employed in the coatings field can be used to prepare the blocked polyisocyanate. It is preferred, however, to employ polyisocyanates whose isocyanate groups are attached to aliphatic or cycloaliphatic radicals. Examples of such polyisocyanates are hexamethylene diisocyanate, isophorone diisocyanate, trimethylhexamethylene diisocyanate, dicyclohexylmethane diisocyanate and 1,3-bis(2-isocyanatoprop-2-yl)benzene (TMXDI) and also adducts of these polyisocyanates with polyols, especially low molecular mass polyols such as trimethylolpropane, for example, and isocyanurate- and/or biuret-functional polyisocyanates derived from these polyisocyanates. As polyisocyanates it is particularly preferred to employ hexamethylene diisocyanate and isophorone diisocyanate, isocyanurate- or biuret-functional polyisocyanates derived from these diisocyanates and containing preferably more than two isocyanate groups in the molecule, and reaction products of hexamethylene diisocyanate and isophorone diisocyanate or of a mixture of hexamethylene diisocyanate and isophorone diisocyanate with 0.3–0.5 equivalent of a low molecular mass polyol having a molecular weight of from 62 to 500, preferably from 104 to 204, in particular a triol such as trimethylolpropane, for example. As blocking agents (Z1) use is made of dialkyl malonates or a mixture of dialkyl malonates. Examples of dialkyl malonates that can be employed are dialkyl malonates having in each case 1 to 6 carbon atoms in the alkyl radicals, such as dimethyl malonate and diethyl malonate, for example, with preference being given to the use of diethyl malonate. As blocking agents (Z2) use is made of blocking agents which are different from (Z1) and contain active methylene groups, and oximes and mixtures of these blocking agents. Examples of blocking agents which can be employed as blocking agent (Z2) are methyl, ethyl, propyl, butyl, pentyl, hexyl, heptyl, octyl, nonyl, decyl or dodecyl acetoacetate, acetone oxime, methyl ethyl ketoxime, acetylacetone, formaldoxime, acetaldoxime, benzophenoxime, acetoxime and diisobutyl ketoxime. As blocking agent (Z2) it is preferred to employ an alkyl acetoacetate having 1 to 6 carbon atoms in the alkyl radical, or a mixture of such alkyl aceto-acetates, or a ketoxime or a mixture of ketoximes. Particular preference is given to the use of ethyl acetoacetate or methyl ethyl ketoxime as blocking agent (Z2).

A preferred embodiment of the invention is characterized in that the amounts of the constituents (1) to (3) are chosen in their ratios to one another such that the ratio OH:(NCO+NH—CO—OR) is from 1.0:0.5 to 1.0:2.0, preferably from 1.0:0.8 to 1.0:1.5. Specifically, the polyisocyanate component is employed in the novel coating compositions, for example, advantageously in an amount such that the ratio of the hydroxyl groups of the binder (1) to the isocyanate groups of the crosslinkers (2) and (3) is between 1:2 and 2:1, with particular preference between 1:1.5 and 1.5:1.

The proportion between the constituents (2) and (3) is advantageously selected so that the amount of tris (alkoxycarbonylamino)triazine or of the mixture of tris (alkoxycarbonylamino)triazines is from 1 to 99% by weight, preferably from 5 to 90% by weight, based on the overall amount of tris(alkoxycarbonylamino)triazine or mixture of tris(alkoxycarbonylamino)triazines plus free isocyanates or the mixture of free polyisocyanates. If blocked isocyanates are included, then the same thing applies but now based in each case on the corresponding overall amount of isocyanates rather than just free polyisocyanates.

The component system can specifically comprise UV absorbers, preferably triazine compounds, and free-radical scavengers in at least one of the two components (I) and/or (II). The component system may also include crosslinking catalysts. Suitable as such, in particular, are organometallic compounds, preferably organotin and/or organobismuth compounds. Tertiary amines may also be considered. The component system can in addition comprise Theological agents and other coatings auxiliaries in at least one of the two components (I) and/or (II). It is of course also possible for pigments of any kind, examples being colour pigments such as azo pigments, phthalocyanine pigments, carbonyl pigments, dioxazine pigments, titanium dioxide, coatings-grade carbon black, iron oxides and oxides of chromium or of cobalt, or special-effect pigments, such as metal flake pigments, especially aluminium flake pigments, and pearlescent pigments, to be incorporated in at least one of the two components (I) and/or (II). Preferably, however, the pigments are either absent or transparent.

The two components (I) and (II) are prepared by the customary methods from the individual constituents, with stirring. The preparation of the coating composition from components (I) and (II) likewise takes place by means of stirring or dispersion using the commonly employed apparatus, for example by means of dissolvers or the like or by means of likewise commonly employed two-component metering and mixing units, or by means of the process described in DE-A-195 10 651, page 2, line 62 to page 4, line 5 for preparing aqueous two-component polyurethane coating materials.

The components, especially component (I), can be formulated as non-aqueous (i.e. with organic solvents) or as aqueous components. In the case of a non-aqueous formulation the organic solvents customary in coatings preparation can be used. By means of aqueous components, aqueous coating compositions are obtained after components (I) and (II) have been mixed. If an aqueous coating composition is desired, however, then components (I) and/or (II) can also be formulated largely free from water and largely free from organic solvents and yet dispersible in water. The aqueous coating composition is then obtained by mixing the components and adding water. A water-dispersible or water-soluble component (I) can be formulated in a customary manner by introducing, for example, acidic groups into the binder which are then neutralized with a customary base, for example ammonia or an organic amine such as triethylamine. The dissolving or dispersing of a water-dispersible component (I) and/or (II) in water takes place in a customary manner, for example by vigorous stirring with or without gentle heating. Alternatively, dissolving or dispersing in water can be effected by means of non-ionic emulsifiers. To this extent reference is made likewise to standard techniques for the preparation of aqueous coating materials.

The invention also relates to a process for preparing a component system according to the invention. Essentially three variants are advantageous for this purpose. Firstly, a process for preparing a component system, which is characterized in that component (I) is prepared by mixing the hydroxy-functional binder or the mixture of hydroxy-functional binders with tris(alkoxycarbonylamino)triazine or the mixture of tris(alkoxycarbonylamino)triazines, and component (II) is prepared from free polyisocyanate or the mixture of free polyisocyanates. Secondly, a process for preparing a component system, which is characterized in that component (II) is prepared by mixing free isocyanates or the mixture of free polyisocyanates with tris (alkoxycarbonylamino)triazine or the mixture of tris (alkoxycarbonylamino)triazines, and component (I) is prepared form the hydroxy-functional binder or the mixture of hydroxy-functional binders. Thirdly, a process for preparing a component system, which is characterized in that component (II) is prepared by mixing free isocyanates or the mixture of free polyisocyanates with a first portion of tris(alkoxycarbonylamino)triazine or the mixture of tris (alkoxycarbonylamino) triazines, and component (I) is prepared by mixing the hydroxy-functional binder or the mixture of hydroxy-functional binders with a second portion of tris(alkoxycarbonylamino)triazine or the mixture of tris (alkoxycarbonylamino)triazines. In the case of all the variants it is advantageous if the amounts of the constituents (1) to (3) are chosen so that the ratio OH:(NCO+NH—CO—OR) is from 1.0:0.5 to 1.0:2.0, preferably from 1.0:0.8 to 1.0:1.5.

Finally, the invention also relates to the uses set out in Patent claims 11 to 13.

The component system according to the invention is employed for producing single-coat or multicoat finishes and preferably for producing topcoats. It can also, however, be intended for producing a clearcoat which is to be applied over a basecoat film, for example a clearcoat of a multicoat finish produced by the wet-on-wet method. The plastics or the other substrates can of course also be coated directly with the clearcoat or the topcoat.

Finally, the coating compositions can also be applied to other substrates, such as metal, wood or paper, for example. Application takes place with the aid of customary methods, for example spraying, knife coating, dipping or brushing.

Owing to the specified uses, according to the invention, of the component system the invention also embraces binders and coating materials prepared therewith, and also articles coated with these binders and coating materials.

The coating compositions according to the invention are preferably cured at from 80 to 170° C., with particular preference at temperatures between 100 and 150° C. In specific embodiments of the coating compositions according to the invention it is also possible to employ lower curing temperatures.

The coating compositions according to the invention are preferably employed for producing topcoat finishes. The coating compositions according to the invention can be employed in both the production-line finishing and the refinishing of car bodies. They are preferably employed, however, in the production-line finishing sector.

The invention is described in more detail below with reference to the examples:
1. Preparation of Binder Solutions
1.1. Acrylate Resin A 899 g of an aromatic hydrocarbon fraction having a boiling range of 158° C.–172° C. are weighed out into a laboratory reactor having a useful volume of 4 l which is fitted with a stirrer, two dropping funnels for the monomer mixture and initiator solution, respectively, a nitrogen inlet pipe, thermometer and reflux condenser. The solvent is heated to 140° C. When it has reached 140° C., a monomer mixture composed of 727 g of n-butyl methacrylate, 148 g of cyclohexyl methacrylate, 148 g of styrene, 445 g of 4-hydroxybutyl acrylate and 15 g of acrylic acid is metered into the reactor at a uniform rate over the course of 4 hours, and an initiator solution of 29 g of t-butyl perethylhexanoate in 89 g of the above-described aromatic solvent is metered into the reactor at a uniform rate over the course of 4.5 hours. The metered addition of the monomer mixture and of the initiator solution is begun simultaneously. After the end of the addition of the initiator, the reaction mixture is held at 140° C. for two hours more and then cooled. The resulting polymer solution has a solids content of 62% (determined in a convection oven at 130 degrees C. for 1 h), an acid number of 9 and a viscosity of 21 dPa.s (measured on a 60% dilution of the polymer solution in the above-described aromatic solvent using an ICI plate/cone viscometer at 23 degrees C.).
1.2. Acrylate Resin B 897 g of an aromatic hydrocarbon fraction having a boiling range of 158 degrees C. –172 degrees C. are weighed out into a laboratory reactor having a useful volume of 4 l which is fitted with a stirrer, two dropping funnels for the monomer mixture and initiator solution, respectively, a nitrogen inlet pipe, thermometer and reflux condenser. The solvent is heated to 140 degrees C. When it has reached 140 degrees C., a monomer mixture composed of 487 g of t-butyl acrylate, 215 g of n-butyl methacrylate, 143 g of styrene, 572 g of hydroxypropyl methacrylate and 14 g of acrylic acid is metered into the reactor at a uniform rate over the course of 4 hours, and an initiator solution of 86 g of t-butyl perethylhexanoate in 86 g of the above-described aromatic solvent is metered into the reactor at a uniform rate over the course of 4.5 hours. The metered addition of the monomer mixture and of the initiator solution is begun simultaneously. After the end of the addition of the initiator, the reaction mixture is held at 140 degrees C. for two hours more and then cooled. The resulting polymer solution has a solids content of 62% (determined in a convection oven at 130 degrees C. for 1 h), an acid number of 10 and a viscosity of 23 dPa.s (measured on a 60% dilution of the polymer solution in the above-described aromatic solvent using an ICI plate/cone viscometer at 23 degrees C.).
1.3 Alkyd Resin C 1330 g of hexahydrophthalic anhydride, 752 g of 1,1,1-trimethylolpropane, 249 g of 1,4-dimethylolcyclohexane, 204 g of 1,6-hexanediol, 136 g of isononanoic acid (as an isomer mixture of 3,3,5-trimethylhexanoic acid and 3,5,5-trimethylhexanoic acid) and 75 g of xylene as entrainer are weighed out into a laboratory reactor having a useful volume of 4 l which is fitted with a stirrer, water separator, reflux condenser, nitrogen inlet pipe and thermometer. The water separator is filled with xylene. The contents of the reactor are heated to 210 degrees C. over the course of 8 hours such that there is uniform reflux of the entrainer. The contents of the reactor are held at 210 degrees C. until an acid number of 17.1 and a viscosity of 15 dPa.s, measured on a 60% strength solution of the reaction mixture in the aromatic solvent described for the acrylate resins A and B, are reached. The reactor contents are then cooled to 140 degrees C. and diluted with a sufficient amount of the abovementioned aromatic solvent to give a nonvolatiles content of 61% (determined in a convection oven at 130 degrees C. for 60 minutes) The alkyd resin solution prepared in this way has an acid number of 17.1 and a viscosity of 15 dPa.s (measured on an ICI plate/cone viscometer at 23 degrees C.).

2. Preparation of the Two-component Clearcoats 2.1. Component (I)

Component (I) of the two-component clearcoats is prepared by weighing out the binder solution and then adding, with thorough stirring, the triazine crosslinkers, solvents, UV absorbers, free-radical scavengers and levelling agents in the amounts stated in Table 1. The amounts in this table and the following tables are to be understood as amounts by weight.

TABLE 1

|  | Comp. 1a | Comp. 1b | Comp. 1c | Comp. 1d | Comp. 1e | Comp. 1f |
|---|---|---|---|---|---|---|
| Acrylate resin A | 79.6 | 55.0 |  |  |  |  |
| Acrylate resin B |  |  | 62.8 | 50.0 |  |  |
| Alkyd resin C |  |  |  |  | 72.0 | 62.0 |
| Triazine crosslinker accordng to US 5,084,541 |  | 13 |  | 12.8 |  | 10.0 |
| Tiniuvin 400 | 1.3 | 1.3 | 1.0 | 1.0 |  |  |
| Tiniuvin 123 | 1.0 | 1.0 | 1.5 | 1.5 |  |  |
| Tiniuvin 384 |  |  |  |  | 1.2 | 1.2 |
| Tiniuvin 292 |  |  |  |  | 1.0 | 1.0 |
| Silicone oil solution | 2.5 | 2.5 | 2.5 | 2.5 | 3.0 | 3.0 |
| Butyldiglycol acetate | 4.0 | 4.0 | 10.0 | 10.0 | 9.0 | 9.0 |
| Butylglycol acetate | 4.0 | 4.0 | 8.0 | 8.0 | 5.5 | 5.5 |
| Methoxypropyl acetate | 3.0 | 3.6 | 8.0 | 8.4 |  |  |
| Solvent naphtha |  |  |  |  | 5.1 | 5.1 |
| Butyl acetate | 4.6 | 15.6 | 5.8 | 5.8 | 3.2 | 3.2 |

2.2. Component (II)

Component (II) consists of a solution of commercial isocyanurate trimers in an appropriate solvent.

It is prepared by stirring the solvent into the supply form of the isocyanurates according to Table 2.

TABLE 2

|  | Component 2a | Component 2b |
|---|---|---|
| Desmodur Z 4470 | 63.5 | 26.5 |
| Tolonate HDT 90 | 24.8 |  |
| Basonat HI 190 B/S |  | 61.8 |
| Solvent naphtha | 5.85 | 5.85 |
| Butyl acetate | 5.85 | 5.85 |

3. Preparation of Clearcoats

The clearcoats are prepared by mixing components (I) and (II) in the proportions indicated in Table 3 and applying the mixture immediately after mixing. For the application it is possible alternatively to employ special two-component units which are known to the skilled worker and therefore require no further description here. Table 3 also indicates properties of the clearcoats, which illustrate the invention.

TABLE 3

|  | Clear-coat 1 | Clear-coat 2 | Clear-coat 3 | Clear-coat 4 | Clear-coat 5 | Clear-coat 6 |
|---|---|---|---|---|---|---|
| Comp. 1a | 73.9 |  |  |  |  |  |
| Comp. 1b |  | 93.5 |  |  |  |  |
| Comp. 1c |  |  | 77.0 |  |  |  |
| Comp. 1d |  |  |  | 91.0 |  |  |
| Comp. 1e |  |  |  |  | 76.7 |  |
| Comp. 1f |  |  |  |  |  | 86.7 |
| Comp. 2a | 26.1 | 6.5 |  |  |  |  |
| Comp. 2b |  |  | 23.0 | 9.0 | 23.3 | 13.3 |
| Scratch resistance*3 | poor | good | poor | good | poor | good |
| JV (rating) *1) | 4.0 | 4.0 | 4.5 | 4.5 | 3.0 | 3.0 |
| Stone-chip *2) | poor | good | poor | good | poor | good |

*1) Rating after 14 weeks of outdoor weathering in Jacksonville, Florida (1 = no damage, 10 = complaint case)
*2) Stone-chip testing in acoordance with VDA [German Carmakers' Association] 621–428 (single impact) Progress in organic coatings, Vol. 22, 1993 page 27–37

What is claimed is:

1. A two-component coating composition comprising
a first component (I) comprising
(1) a hydroxy-functional binder or a mixture of hydroxy-functional binders,
a second component (II) comprising
(3) a free polyisocyanate or a mixture of free polyisocyanates, wherein component (I), component (II) or both of components (I) and (II) further comprise
(2) tris(alkoxycarbonylamino)triazine or a mixture of tris(alkoxycarbonylamino)triazines.

2. The two component coating composition of claim 1, wherein the hydroxy-functional binder or the mixture of hydroxy-functional binders is selected from the group consisting of binders comprising hydroxy-functional polyacrylates, binders comprising hydroxy-functional polyesters, binders comprising hydroxy-functional polyurethanes and mixtures thereof.

3. The two-component coating composition of claim 1, comprising from 1 to 99% by weight of tris (alkoxycarbonylamino)triazine or of the mixture of tris (alkoxycarbonylamino)triazines, based on the overall amount of tris(alkoxycarbonylamino)triazine or mixture of tris(alkoxycarbonylamino)triazines and the polyisocyanates or mixture of free polyisocyanates.

4. The two-component coating composition of claim 1 wherein the amounts of the constituents (1) to (3) are chosen in their ratios to one another such that the ratio OH:(NCO+NH—CO—OR) is from 1.0:0.5 to 1.0:2.0.

5. The two-component coating composition of claim 1, wherein in at least one or more of components (I) and (II) further comprise one or more members selected from the group consisting of UV absorbers, free-radical scavengers, and mixtures thereof.

6. The two-component coating composition of claim 1, wherein at least one or more of components (I) and (II) further comprise rheological agents.

7. The two-component coating composition of claim 1, wherein at least one or more of components (I) and (II) further comprise one or more members selected from the group consisting of organometallic catalysts, tertiary amines, and mixtures thereof.

8. A process for preparing a two-component coating composition of claim 1, comprising mixing the hydroxy-functional binder or the mixture of hydroxy-functional binders (1) with tris (alkoxycarbonylamino)triazine or the mixture of tris (alkoxycarbonylamino)triazines (2) to prepare first component (I), and preparing second component (II) from the free polyisocyanate or the mixture of free polyisocyanates.

9. A process for preparing a two-component coating composition of claim 1, comprising mixing free polyisocyanates or the mixture of free polyisocyanates (3) with the tris(alkoxycarbonylamino) triazine or mixture of tris(alkoxycarbonylamino) triazines (2) to prepare second component (II), and preparing first component (I) from the hydroxy-functional binder or the mixture of hydroxy-functional binders (1).

10. A process for preparing a two-component coating composition of claim 1, comprising mixing the free polyisocyanates or the mixture of free polyisocyanates (3) with a first portion of the tris (alkoxycarbonylamino)triazine or the mixture of tris (alkoxycarbonylamino)triazines (2) to prepare second component (II), and mixing the hydroxy-functional binder or the mixture of hydroxy-functional binders (1) with a second portion of tris(alkoxycarbonylamino)triazine or the mixture of tris(alkoxycarbonylamino)triazines (2) to prepare first component (I).

11. The process according to one of claims 8 to 10, further comprising choosing the amounts of the constituents (1) to (3) so that the ratio OH:(NCO+NH—CO—OR) is from 1.0:0.5 to 1.0:2.0.

12. A method of coating a substrate comprising providing a two-component coating composition of claim 1, mixing component (I) and component (II) together to form a coating composition prior to application, applying the coating composition to a substrate, and baking the applied coating composition.

13. A method of coating a substrate comprising providing a two-component coating composition of claim 1, applying component (I) and component (II) to a substrate with the aid of a two-component application device to form a coated substrate, and baking the coated substrate.

14. The method of claim 12 wherein the two-component coating composition is a topcoat or a clearcoat.

15. The two-component coating composition of claim 3, comprising from 5 to 90% by weight of tris (alkoxycarbonylamino)triazine or of the mixture of tris (alkoxycarbonylamino)triazines, based on the overall amount of tris(alkoxycarbonylamino)triazine or mixture of tris(alkoxycarbonylamino)triazines and the free polyisocyanates or mixture of free polyisocyanates.

16. The two-component coating composition of claim 4 wherein the amounts of the constituents (1) to (3) are chosen in their ratios to one another such that the ratio OH:(NCO+ NH—CO—OR) is from 1.0:0.8 to 1.0:1.5.

17. The two-component coating composition of claim 5, wherein in at least one or more of components (I) and (II) further comprise triazine compounds as UV absorbers.

18. The two-component coating composition of claim 7, wherein at least one or more of components (I) and (II) further comprise one or more members selected from the group consisting of organotin compounds, organobismuth compounds, tertiary amines, and mixtures thereof.

19. The process of claim 11 further comprising choosing the amounts of the constituents (1) to (3) so that the ratio OH:(NCO+NH—CO—OR) is from 1.0:0.8 to 1.0:1.5.

* * * * *